US012779554B2

(12) United States Patent
Muramatsu

(10) Patent No.: US 12,779,554 B2
(45) Date of Patent: Nov. 3, 2026

(54) SPINDLE DEVICE

(71) Applicant: FANUC CORPORATION, Minamitsuru-gun (JP)

(72) Inventor: Toshifumi Muramatsu, Yamanashi-ken (JP)

(73) Assignee: FANUC CORPORATION, Minamitsuru-gun (JP)

(*) Notice: Subject to any disclaimer, the term of this patent is extended or adjusted under 35 U.S.C. 154(b) by 792 days.

(21) Appl. No.: 18/036,513

(22) PCT Filed: Nov. 11, 2021

(86) PCT No.: PCT/JP2021/041448
§ 371 (c)(1),
(2) Date: May 11, 2023

(87) PCT Pub. No.: WO2022/107672
PCT Pub. Date: May 27, 2022

(65) Prior Publication Data

US 2023/0415285 A1 Dec. 28, 2023

(30) Foreign Application Priority Data

Nov. 17, 2020 (JP) ................................ 2020-190873

(51) Int. Cl.
*B23B 31/26* (2006.01)

(52) U.S. Cl.
CPC ...... *B23B 31/263* (2013.01); *B23B 2250/124* (2022.01); *B23B 2260/126* (2013.01)

(58) Field of Classification Search
CPC . B23B 31/1071; B23B 31/261; B23B 31/263; B23B 2250/124; B23B 2260/126; Y10T 409/309464
See application file for complete search history.

(56) References Cited

U.S. PATENT DOCUMENTS

| | | | | |
|---|---|---|---|---|
| 5,190,272 A * | 3/1993 | Zika | ........................ | B23Q 16/08 269/309 |
| 10,252,389 B2 * | 4/2019 | Filho | ..................... | B23B 31/261 |

FOREIGN PATENT DOCUMENTS

| | | | | |
|---|---|---|---|---|
| CN | 101745657 A | 6/2010 | | |
| CN | 204935200 U | 1/2016 | | |
| GB | 2313086 A * | 11/1997 | ......... | B23B 31/1071 |
| GB | 2322576 A * | 9/1998 | ......... | B23B 31/1071 |
| JP | H 02-043145 U1 | 3/1990 | | |
| JP | H 09-011008 A | 1/1997 | | |
| JP | H 10-296517 A | 11/1998 | | |
| JP | 3118512 B2 | 12/2000 | | |

(Continued)

OTHER PUBLICATIONS

International Search Report (ISR) (PCT Form PCT/ISA/210), in PCT/JP2021/041448, dated Feb. 1, 2022.

(Continued)

*Primary Examiner* — Eric A. Gates
(74) *Attorney, Agent, or Firm* — Sughrue Mion, PLLC

(57) ABSTRACT

A spindle device includes: a spindle: a drawbar provided in a through-hole in the spindle: a plurality of balls that clamp or unclamp a pull stud in response to the drawbar moving forward or backward; and a seal member fixed to a wall surface that forms a flow path in the drawbar, so as to come into contact with an inclined surface of the inclined section of the pull stud clamped by the plurality of balls.

2 Claims, 3 Drawing Sheets

(56) References Cited

FOREIGN PATENT DOCUMENTS

| | | | | |
|---|---|---|---|---|
| JP | 2001-150295 | A | 6/2001 | |
| JP | 2002-321138 | A | 11/2002 | |
| JP | 2009-154225 | A | 7/2009 | |
| JP | 2020-131337 | A | 8/2020 | |
| WO | WO-2009156829 | A1 * | 12/2009 | ........... B23B 31/263 |
| WO | WO 2012/156157 | A1 | 11/2012 | |

OTHER PUBLICATIONS

Chinese Office Action dated Mar. 27, 2025 in Application No. 202180075786.1.

* cited by examiner

SPINDLE DEVICE

TECHNICAL FIELD

The present invention relates to a spindle device.

BACKGROUND ART

There is a spindle device in which a tool or a tool holder is mounted at one end of a spindle. A spindle device disclosed in JP 3118512 B2 has a pull stud, a draw bar, and a plurality of balls. The pull stud is attached to the tool or the tool holder. The draw bar is provided in a through hole formed in the spindle and can advance and retreat along the axial direction of the spindle. The plurality of balls move in the radial direction of the spindle according to the advance and retreat of the draw bar and clamp or unclamp the pull stud.

The spindle device disclosed in JP 3118512 B2 employs a through-coolant structure in which a fluid such as cutting oil is supplied to the tip of a tool through the through-hole of the spindle. Therefore, an O-ring is provided to the spindle device (see FIG. 5) so that the fluid flowing through the through-hole of the spindle does not flow out to a tapering surface formed on the inner peripheral surface of one end of the spindle. The O-ring is provided between a constant-outer-diameter surface of a flange projecting from the outer peripheral surface of the pull stud and the inner peripheral surface of the second sleeve of the draw bar.

SUMMARY OF THE INVENTION

However, in the spindle device disclosed in JP 3118512 B2, when the pull stud is put in or taken out from one end of the spindle with respect to the through hole, friction caused by sliding of the pull stud against the sealing member (O-ring) becomes large. Therefore, there is concern that the durability of the sealing member reduces. When the durability of the sealing member reduces, the through-coolant (cooling) fluid adheres to the tapering surface of the spindle, and as described in JP 3118512 B2, the tool-holding rigidity reduces.

Accordingly, it is an object of the present invention to provide a spindle device capable of suppressing reduction in tool-holding rigidity.

An aspect of the present invention is a spindle device including: a spindle that is formed with a through hole penetrating along an axial direction; a draw bar that is provided in the through hole and is configured to advance and retreat with respect to one end of the spindle and is formed with a flow path communicating with the through hole along the axial direction; and a plurality of balls that are movable in a radial direction of the spindle in accordance with advance and retreat of the draw bar and clamp or unclamp a pull stud inserted into the through hole from one end of the spindle, wherein the pull stud is formed with a flange including a projecting portion that projects from an outer peripheral surface of the pull stud and an inclined portion that reduces in diameter from the projecting portion toward a distal end of the pull stud, and the spindle device further comprises a sealing member that is fixed to a wall surface forming the flow path of the draw bar so as to make contact with an inclined surface of the inclined portion of the pull stud clamped by the plurality of balls.

According to the aspect of the present invention, friction with the sealing member when the pull stud is put in and taken out from one end of the spindle with respect to the through hole is greatly reduced, and durability of the sealing member is improved. Therefore, the through-coolant fluid is prevented from adhering to the inner peripheral surface of the spindle and as a result, the tool-holding rigidity can be prevented from being reduced.

DETAILED DESCRIPTION OF THE INVENTION

The embodiments of the present invention will be described in detail below with reference to the accompanying drawings.

Embodiment

Figure 1:
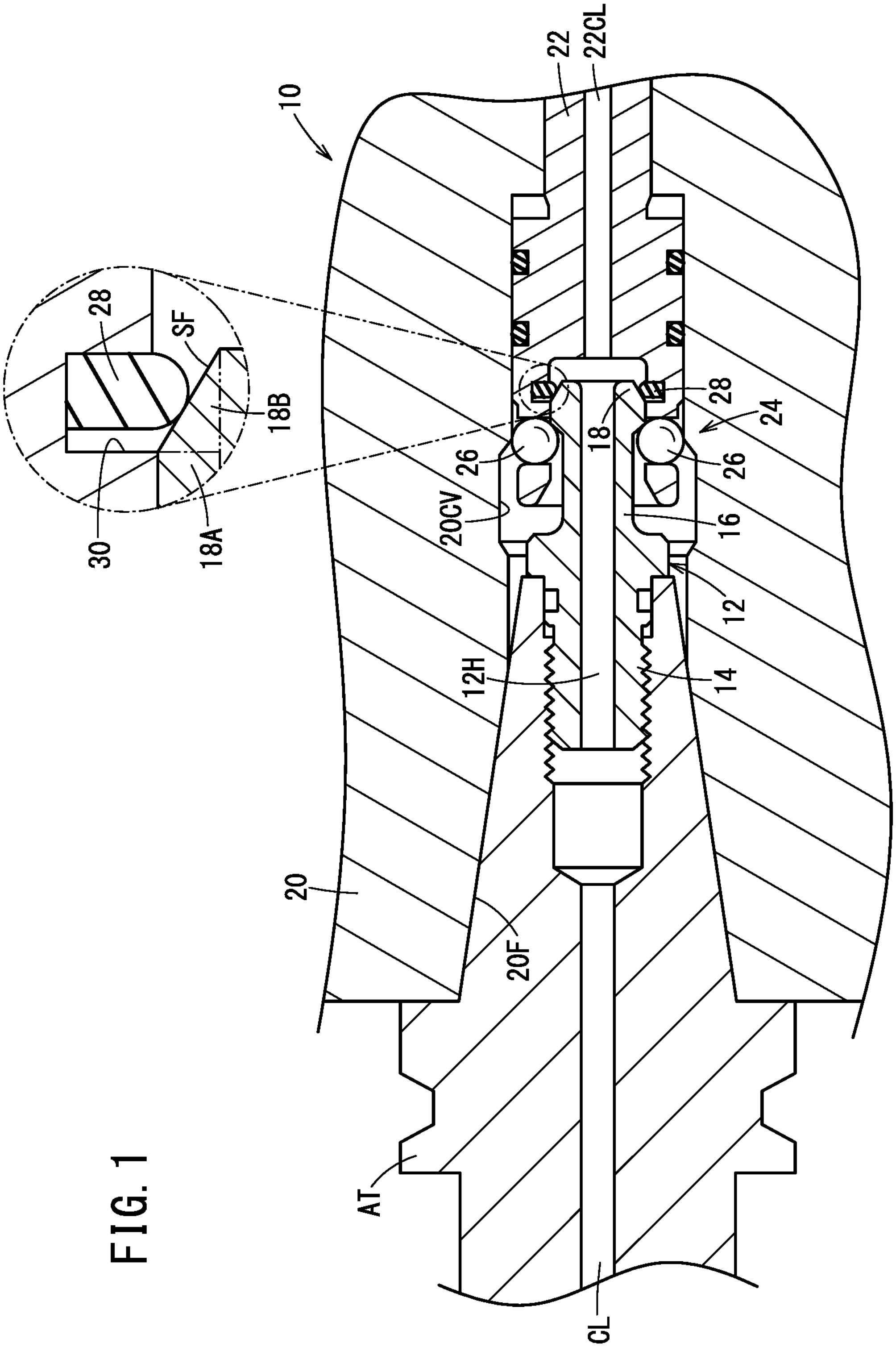
FIG. 1 is a cross-sectional view showing a spindle device of the present embodiment when a target object is mounted.
Figure 2:
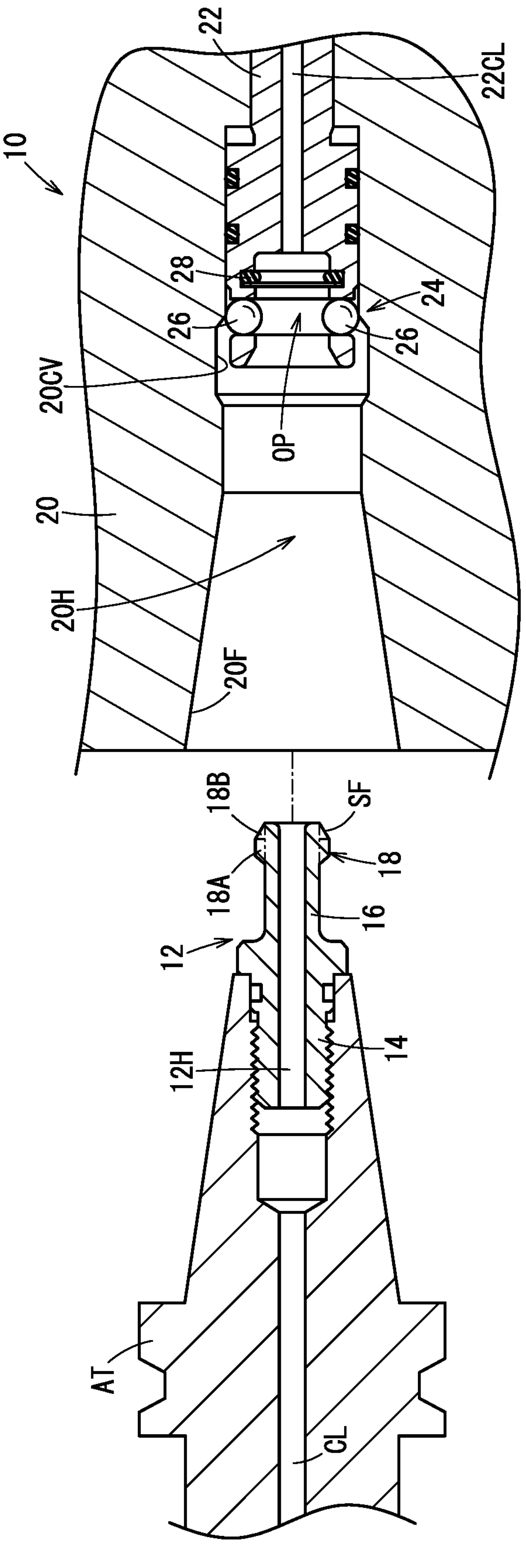
FIG. 2 is a cross-sectional view showing the spindle device of the present embodiment when the target object is not mounted.

FIG. 1 is a sectional view showing a spindle device 10 of the present embodiment when a target object AT is mounted. FIG. 2 is a sectional view showing the spindle device 10 of the present embodiment when the target object AT is not mounted. The target object AT is a tool or a tool holder, and the pull stud 12 is attached to the tool or the tool holder.

A pull stud 12 is a joint piece for joining the tool or the tool holder to the spindle device 10. The pull stud 12 is formed with a through hole 12H along the axis of the pull stud 12. The through hole 12H of the pull stud 12 communicates with a flow path CL with which the tool or the tool holder is formed.

The pull stud 12 includes a fitting portion 14 and an extended portion 16. The fitting portion 14 is a portion to be fitted into the flow path CL of the tool or the tool holder. The extended portion 16 is a portion extending in a direction substantially perpendicular to the opening surface of the flow path CL. In other words, the extended portion 16 extends along the axis of the pull stud 12. A flange 18 is formed at an end portion of the extended portion 16 opposite to the end portion near the fitting portion 14.

The flange 18 is formed around the axis of the pull stud 12. The flange 18 has a projecting portion 18A and an inclined portion 18B. The projecting portion 18A protrudes from the outer peripheral surface of the pull stud 12. The inclined portion 18B reduces in diameter from the projecting portion 18A toward the distal end of the pull stud 12. An inclined surface SF of the inclined portion 18B tapers toward the distal end of the pull stud 12.

The spindle device 10 holds, in an attachable and detachable manner, the pull stud 12 that is attached to the target object (tool or tool holder) AT. The spindle device 10 includes a spindle 20, a draw bar 22, and a clamping mechanism 24.

The spindle 20 is a shaft to/from which the tool or the tool holder is attached/detached. The spindle 20 is formed with a through hole 20H that penetrates along the axial direction of the spindle 20. The through hole 20H is formed so that part of the target object AT can be inserted therein. A tapering surface 20F is provided on the inner peripheral surface of the through hole 20H. The tapering surface 20F is brought into close contact with the outer peripheral surface of part of the target object AT inserted into the through hole 20H. The tapering surface 20F tapers from a first end portion that is one end of the spindle 20 to a second end portion that is the other end. The first end portion is an end portion of the spindle 20 on the side where the pull stud 12 is put in or taken out. The second end portion is an end portion of the spindle 20 opposite to the first end portion.

The draw bar 22 is provided in the through hole 20H of the spindle 20. The draw bar 22 can advance and retreat in the through hole 20H of the spindle 20. The draw bar 22 is closer to the second end portion of the spindle 20 than the tapering surface 20F. When not pressed by a pressing mechanism (not shown), the draw bar 22 remains at a clamp position in the through hole 20H. On the other hand, when the draw bar 22 is pressed by the pressing mechanism, the draw bar 22 moves in the through hole 20H from the clamp position toward an unclamp position closer to the first end portion of the spindle 20 than the clamp position. If the draw bar 22 remains pressed by the pressing mechanism, the draw bar 22 stays at the unclamp position. On the other hand, when the pressing by the pressing mechanism is released, the draw bar 22 moves in the through hole 20H from the unclamp position toward the clamp position and stays at the clamp position. The pressing mechanism is provided closer to the second end portion of the spindle 20 than the draw bar 22.

The draw bar 22 is formed with a flow path 22CL communicating with the through hole 20H along the axial direction of the spindle 20. The flow path 22CL of the draw bar 22 near the first end portion of the spindle 20 is formed in a manner so that a distal end portion of the pull stud 12 can be inserted into the flow path 22CL. Through-coolant (cooling) fluid supplied from the second end portion of the spindle 20 to the draw bar 22 via the through hole 20H flows toward the first end portion of the spindle 20 via the flow path 22CL of the draw bar 22.

The clamping mechanism 24 clamps or unclamps the pull stud 12. The clamping mechanism 24 performs clamping or unclamping using a plurality of balls 26. The plurality of balls 26 are arranged in the through-hole 20H of the spindle 20 at intervals around the axis of the spindle 20. Each of the plurality of balls 26 is provided to the draw bar 22 in a manner so that part of each ball 26 protrudes from both the outer peripheral surface and the inner peripheral surface of the draw bar 22. Each of the plurality of balls 26 is held in a manner so that an opening OP surrounded by the plurality of balls 26 opens and closes in accordance with the advance and retreat of the draw bar 22.

When the draw bar 22 remains in the unclamped position, a region of movement of ball is formed by a concave portion 20CV formed on the inner peripheral surface of the spindle 20. In this case, each of the plurality of balls 26 can move in the radial direction of the spindle 20. Therefore, from the first end portion of the spindle 20 via the through hole 20H, the distal end portion of the pull stud 12 can be inserted into and removed from the opening OP surrounded by the plurality of balls 26. FIG. 2 shows a case where the position of the draw bar 22 is at the clamp position. Accordingly, when the draw bar 22 moves toward the first end portion, the position of the draw bar 22 becomes the unclamp position.

In this state, each of the plurality of balls 26 moves outward in the radial direction of the spindle 20 in response to the insertion of the distal end portion of the pull stud 12, and the opening OP surrounded by the plurality of balls 26 expands.

When the draw bar 22 moves from the unclamp position to the clamp position while being in a state in which the distal end portion of the pull stud 12 is inserted into the opening OP surrounded by the plurality of balls 26, the plurality of balls 26 held by the draw bar 22 move together with the draw bar 22 toward the second end portion of the spindle 20. In this case, the region of movement of ball by the concave portion 20CV is lost (see FIG. 1). For this reason, the plurality of balls 26 come into contact with the projecting portion 18A of the flange 18 of the pull stud 12 to lock the flange 18 of the pull stud 12 (see FIG. 1). As a result, the pull stud 12 is clamped.

On the other hand, when the draw bar 22 moves from the clamp position to the unclamp position while being in a state where the distal end portion of the pull stud 12 is inserted into the opening OP surrounded by the plurality of balls 26, the plurality of balls 26 held by the draw bar 22 move to the concave portion 20CV. In this case, the region of movement of ball is formed by the concave portion 20CV. Therefore, the plurality of balls 26 can move in the radial direction of the spindle 20. As a result, the pull stud 12 is unclamped.

The spindle device 10 of the present embodiment is provided with a sealing member 28. The sealing member 28 is formed in an annular shape. It is fixed to a wall surface that forms the flow path 22CL of the draw bar 22. When the pull stud 12 is kept clamped by the plurality of balls 26, the sealing member 28 contacts the inclined surface SF of the inclined portion 18B of the pull stud 12.

As a result, the friction with the sealing member 28 when the pull stud 12 is put in or taken out is greatly reduced in comparison with the case of JP 3118512 B2 in which the O-ring is provided on the outer peripheral surface of the flange 18 having a constant outer diameter. Therefore, the durability of the sealing member 28 is improved. Therefore, the through-coolant fluid is prevented from adhering to the inner peripheral surface of the through hole 20H including the tapering surface 20F of the spindle 20 via the space between the draw bar 22 and the pull stud 12. As a result, the reduction of the tool-holding rigidity described in JP 3118512 B2 can be suppressed. In addition, compared with the case of JP 3118512 B2 in which the O-ring is provided on the outer peripheral surface of the flange 18 having a constant outer diameter, the size of the spindle 20 in the radial direction can be reduced without changing the shape and suchlike of the pull stud 12.

In the case of the present embodiment, a groove 30 is formed around the axis of the spindle 20 on the wall surface that forms the flow path 22CL of the draw bar 22. The sealing member 28 is provided inside the groove 30 in a manner so that part thereof protrudes from the groove 30, and the outer peripheral surface of the sealing member 28 is fixed to the groove's bottom. As a result, it is possible to prevent the sealing member 28 from being displaced from the fixed position or from being detached from the draw bar 22 by being pushed by the pull stud 12.

Modification

Figure 3:
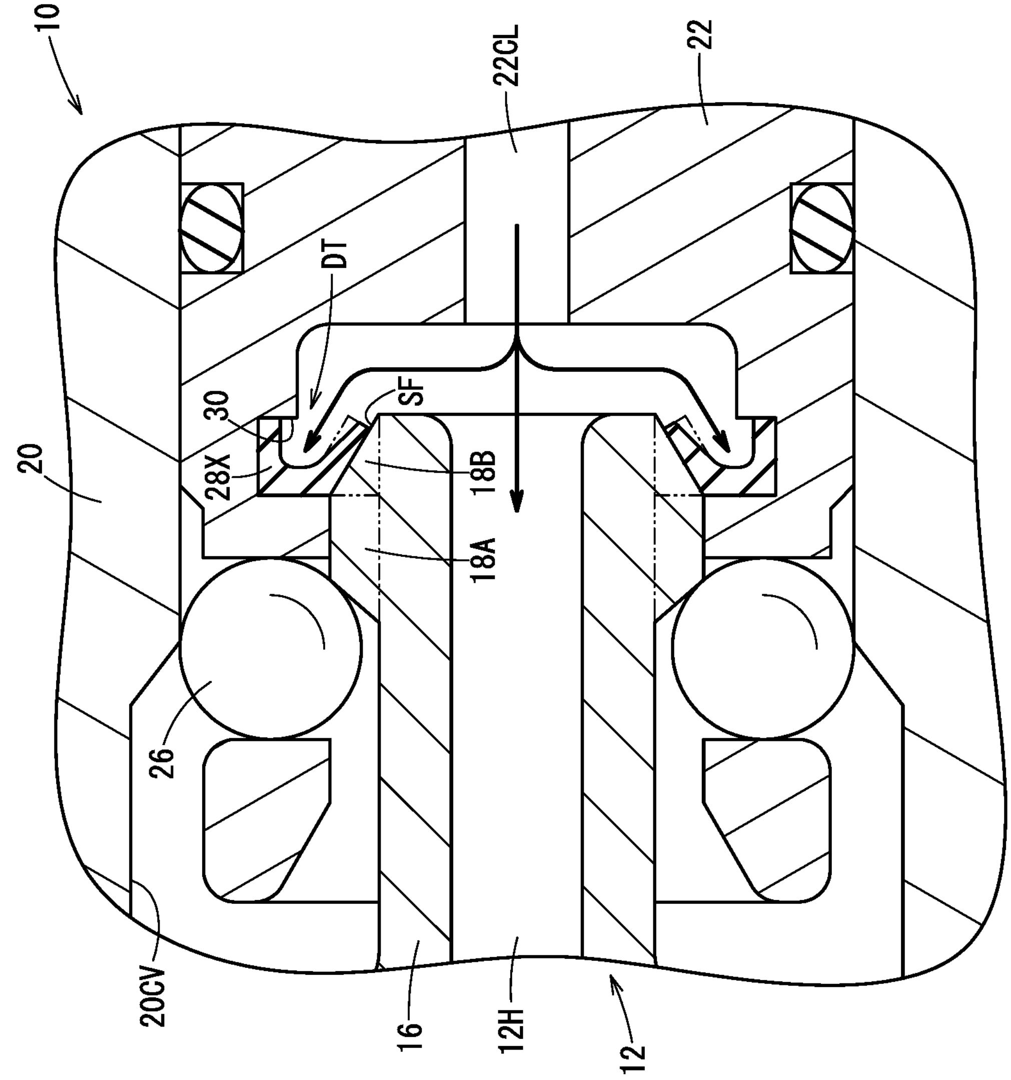
FIG. 3 is a cross-sectional view showing a modification of a sealing member.

FIG. 3 is a sectional view showing a modification, a sealing member 28X. In FIG. 3, the clamping portion of the pull stud 12 of FIG. 1 is shown in an enlarged form, and components equivalent to those described in the embodiment are given the same reference numerals. In this modification, description overlapping with that of the embodiment is omitted.

In this modified example, the sealing member 28X is employed instead of the sealing member 28 of the embodiment. The sealing member 28X is fixed to the wall surface forming the flow path 22CL of the draw bar 22 in the same way as the embodiment. Further, while the pull stud 12 is clamped by the plurality of balls 26, the sealing member 28X comes into contact with the inclined surface SF of the inclined portion 18B of the pull stud 12 as in the embodiment.

The sealing member 28X is different from the sealing member 28 of the embodiment, having a recess DT. The recess DT opens toward the second end portion of the spindle 20. When the through-coolant fluid is supplied from the second end portion of the spindle 20 via the through hole 20H, part of the fluid flows into the recess DT of the sealing member 28X via the flow path 22CL of the draw bar 22. The sealing member 28X is flexible and is deformed so as to tighten the inclined portion 18B of the pull stud 12 by the fluid flowing into the recess DT. As a result, it is possible to improve sealing performance while reducing the friction with the sealing member 28X when the pull stud 12 is put in or taken out.

Invention

The invention that can be understood from the above-described embodiments and modifications will be described below.

A spindle device (10) comprising: a spindle (20) that is formed with a through hole (20H) penetrating along an axial direction; a draw bar (22) that is provided in the through hole and is configured to advance and retreat with respect to one end of the spindle and is formed with a flow path (22CL) communicating with the through hole along the axial direction; and a plurality of balls (26) that are movable in a radial direction of the spindle in accordance with advance and retreat of the draw bar and clamp or unclamp a pull stud (12) inserted into the through hole from one end of the spindle, wherein the pull stud is formed with a flange (18) including a projecting portion (18A) that projects from an outer peripheral surface of the pull stud and an inclined portion (18B) that reduces in diameter from the projecting portion toward a distal end of the pull stud, and the spindle device further includes a sealing member (28, 28X) that is fixed to a wall surface forming the flow path of the draw bar so as to make contact with an inclined surface of the inclined portion of the pull stud clamped by the plurality of balls.

Thus, friction with the sealing member when the pull stud is put in or taken out from one end of the spindle with respect to the through-hole can be greatly reduced, and durability of the sealing member can be improved. Therefore, the through-coolant fluid is prevented from adhering to the inner peripheral surface of the spindle and as a result, the tool-holding rigidity can be prevented from being reduced.

A groove (30) may be formed around the axis of the spindle on the wall surface, and the sealing member may be provided inside the groove in a manner so that part of the sealing member projects from the groove. As a result, it is possible to greatly reduce the displacement of the fixed position of the sealing member or the disengagement of the sealing member from the draw bar when pressed by the pull stud, and durability of the sealing member is improved.

The sealing member (28X) may include a recess (DT) opening on another end side of the spindle and may be deformed by fluid flowing into the recess so as to tighten the inclined portion. Thus, the sealing performance can be improved while reducing friction caused by sliding of the pull stud on the sealing member.

The invention claimed is:

1. A spindle device comprising:

a spindle that is formed with a through hole penetrating along an axial direction;

a draw bar that is provided in the through hole, is configured to advance and retreat with respect to one end of the spindle, and is formed with a flow path communicating with the through hole along the axial direction; and a plurality of balls that are movable in a radial direction of the spindle in accordance with advance and retreat of the draw bar and clamp or unclamp a pull stud inserted into the through hole from one end of the spindle, wherein the pull stud is formed with a flange including a projecting portion that projects from an outer peripheral surface of the pull stud, and an inclined portion that reduces in diameter from the projecting portion toward a distal end of the pull stud, the spindle device further comprises a sealing member that is fixed to a wall surface forming the flow path of the draw bar so as to make contact with an inclined surface of the inclined portion of the pull stud clamped by the plurality of balls, a groove is formed around an axis of the spindle on the wall surface, and the sealing member is provided inside the groove in a manner so that part of the sealing member projects from the groove.

2. The spindle device according to claim 1, wherein the sealing member includes a recess opening on another end side of the spindle and is deformed by fluid flowing into the recess so as to tighten the inclined portion.

* * * * *